W. A. BLACK.
TIRE CORE.
APPLICATION FILED OCT. 23, 1920.
1,388,447.
Patented Aug. 23, 1921.
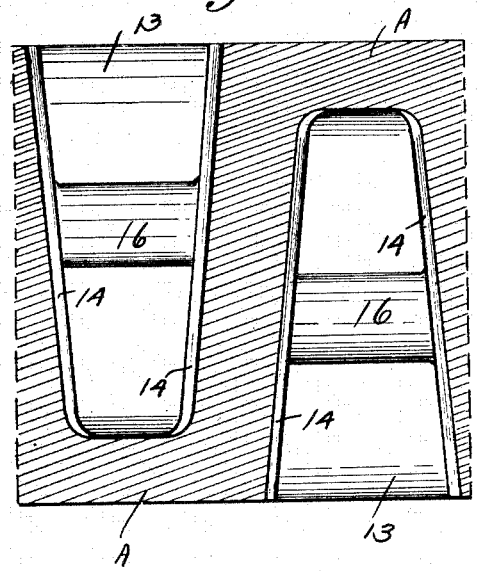
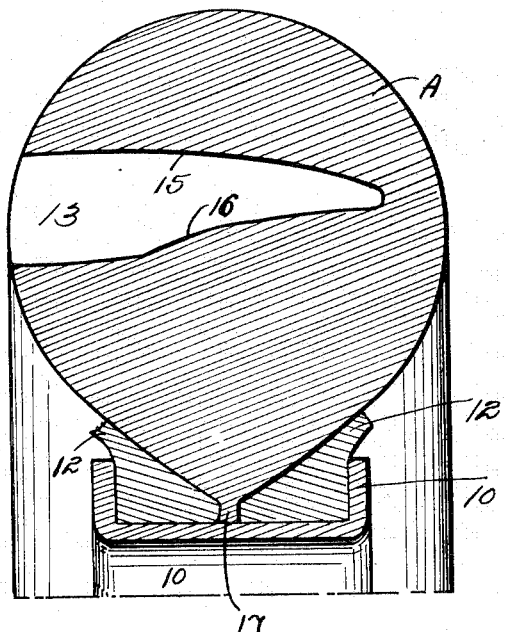
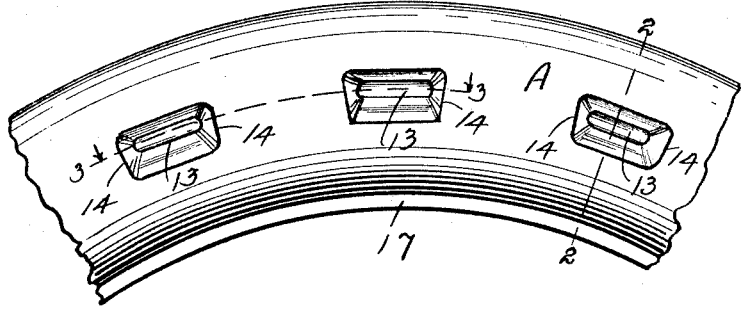
Inventor
Walter A. Black
BY Bair & Freeman
Attorneys.
Witness.
D. L. Cope

UNITED STATES PATENT OFFICE.

WALTER A. BLACK, OF PERRY, IOWA.

TIRE-CORE.

1,388,447.  Specification of Letters Patent.  Patented Aug. 23, 1921.

Application filed October 23, 1920. Serial No. 418,872.

*To all whom it may concern:*

Be it known that I, WALTER A. BLACK, a citizen of the United States, and a resident of Perry, in the county of Dallas and State of Iowa, have invented a certain new and useful Tire-Core, of which the following is a specification.

The object of my invention is to provide a tire core capable of being used in combination with a tire casing, which is of simple, durable and inexpensive construction.

More particularly, my invention relates to a tire core, having apertures in its sides, the apertures in one side being staggered relative to the apertures in the other side, whereby a continuous cushion of resilient material will be provided, so that when the core is in contact with the ground, it will prevent vibrations caused by the load and also prevent road shocks.

Still another object is to provide a tire core, having apertures in its sides, the apertures being staggered relative to each other, the outer and inner sides of the apertures being arched, so as to maintain a maximum of strength and yet using a comparatively small amount of material.

Still another object is to provide the apertures with sides, which are tapered radially inwardly, so that when the core comes in contact with the ground, pressure thus caused will be more equally distributed around the core adjacent to the opening that is nearest to the ground.

Still another object is to provide a tire core, having a central, annular flange on its inner side adapted to be received between the adjacent ends of a tire casing, for preventing the core from movement within the tire casing.

With these and other objects in view, my invention consists in the construction, arrangement and combination of the various parts of my device, whereby the objects contemplated may be attained, as hereinafter more fully set forth, pointed out in my claim, and illustrated in the accompanying drawings, in which:

Figure 1 is a side elevation of a portion of my tire core.

Fig. 2 is an enlarged, central, sectional view taken on the line 2—2 of Fig. 1, showing the arch construction apertures; and Fig. 3 is a sectional view taken on the line 3—3 of Fig. 1, showing the staggered relationship of the apertures.

In the accompanying drawings, I have used the reference numeral 10 to indicate an ordinary demountable rim and 11 to indicate the felly of a wheel.

In Fig. 2 of the drawings, I have shown a portion of a tire casing 12 as received in the rim 10.

My improved tire core A comprises an annular continuous resilient member of rubber or other suitable material, of about the size of a tire casing. The core A may be made to fit snugly in such a casing. This core is provided in its sides with series of apertures 13. The apertures 13 on one side of the core are staggered with relation to the apertures on the other side. The apertures 13 extend from the sides of the core as shown into the core laterally, terminating short of the opposite side thereof.

The apertures are substantially rectangular in outline and are curved at the corners as at $a$. The apertures are tapered from side to side from the sides of the core toward the inner ends, and are also so tapered from top to bottom (radially of the core as a whole).

The walls 15 of the apertures nearest the tread portion of the core are also arched as shown in Fig. 2, crosswise of the core. The opposite walls 16 are shaped as shown in said figure with more sharply inclined portion spaced inwardly from the ends of the apertures.

It will be noted that the apertures 13 are of such size and shape that the thickness of the walls on three sides of the apertures, as illustrated in Fig. 2, is substantially the same, whereby there is provided a cushion of resilient material around each opening of the radial thickness of the core body.

It will be noted that the load is at all times sustained by part of this even cushion extending radially through the core body and it follows that in travel there is an even cushioning effect instead of the vibrating effect that would follow if this cushion were otherwise and especially if the holes extended entirely through the core so as to impose the load alternately first on a thick cushion and then on one broken by a hole.

The arching of the walls 15 and 16 and the tapering of the sides 13 make it possible to make an opening of comparative large size relative to the core itself, and yet retaining the necessary strength required to eliminate road shocks and vibrations caused by the load.

It will be seen that a wall will be formed between the adjacent openings, and when the core is compressed due to the load placed upon it, the wall will give a cushion effect and prevent road shocks or a jerky movement of the core when used.

An annular flange 17 is provided on the inner side of the core A and is placed between the adjacent ends of the beads of a tire casing, thus preventing any movement of the core A within the casing 12.

It will be seen that I have provided a device that when used with a tire casing, will prevent the casing from receiving rim cuts or other injuries that result from the use of pneumatic tires.

The use of a core A holds the tire casing at all times under the same strain and thus prevents the expansion and contraction of the fabric within the casing, which will be caused with a pneumatic tire, due to the fact that the pressure within the tire may vary from time to time. With my device this difficulty is entirely eliminated.

It will be understood that the apertures may be varied in size, so that the core may be used in various sizes of tire casings for use with heavy or light cars.

Some changes may be made in the arrangement and construction of the various parts of my device, without departing from the essential features and purposes of my invention, and it is my intention to cover by my claim, any modified forms of structure, or use of mechanical equivalents, which may be reasonably included within their scope.

I claim as my invention:

In a device of the class described adapted to be used in connection with a tire casing comprising an annular resilient core member, having apertures in its sides, the apertures on one side being staggered with relation to the apertures on the other side, said apertures being narrower circumferentially of the core at their inner ends than at their outer ends and the sides of said apertures being tapered radially inwardly, the walls of the apertures at the inner and outer sides thereof, radially of the device being arched, whereby in all positions of the core with relation to the ground a continuous cushion of resilient material radially of the core is provided for preventing vibration of load and road shocks and a flange formed on said core member adapted to be received between the edges of the casing for preventing any possible twisting of the core.

Des Moines, Iowa, October 15, 1920.

WALTER A. BLACK.